(12) United States Patent
Bleckmann et al.

(10) Patent No.: US 7,784,375 B2
(45) Date of Patent: Aug. 31, 2010

(54) ELECTRIC SHIFT UNIT FOR A MOTOR VEHICLE

(75) Inventors: Michael Bleckmann, Schwerte-Ergste (DE); Peter Molkow, Dortmund (DE); Corinna Machatzke, Schalksmühle (DE); Thomas Luksch, Schalksmühle (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 414 days.

(21) Appl. No.: 12/011,951

(22) Filed: Jan. 30, 2008

(65) Prior Publication Data

US 2009/0178504 A1 Jul. 16, 2009

Related U.S. Application Data

(63) Continuation of application No. PCT/EP2006/008711, filed on Sep. 7, 2006.

(30) Foreign Application Priority Data

Sep. 9, 2005 (DE) ................ 10 2005 043 288

(51) Int. Cl.
*F16H 59/10* (2006.01)
*F16H 61/22* (2006.01)
(52) U.S. Cl. .............. 74/473.23; 74/473.18; 74/473.33
(58) Field of Classification Search ............ 74/473.18, 74/473.21, 473.22, 473.23, 473.33, 473.34
See application file for complete search history.

(56) References Cited

U.S. PATENT DOCUMENTS

| | | | |
|---|---|---|---|
| 4,947,968 A | 8/1990 | Slavin et al. | |
| 6,431,339 B1 | 8/2002 | Beattie et al. | |
| 6,448,670 B1 * | 9/2002 | Onodera et al. | ............ 307/10.1 |
| 6,547,696 B2 | 4/2003 | Syamoto et al. | |
| 6,659,255 B2 * | 12/2003 | Syamoto et al. | .......... 192/220.4 |
| 6,848,331 B2 * | 2/2005 | Syamoto | .................. 74/473.23 |
| 6,993,994 B2 | 2/2006 | Giefer et al. | |
| 2002/0002849 A1 | 1/2002 | Syamoto et al. | |
| 2004/0194567 A1 | 10/2004 | Giefer et al. | |
| 2005/0028632 A1 | 2/2005 | Giefer et al. | |

FOREIGN PATENT DOCUMENTS

| | | |
|---|---|---|
| DE | 101 26 131 A1 | 12/2001 |
| DE | 101 36 426 A1 | 2/2003 |
| DE | 102 47 068 A1 | 4/2004 |
| DE | 103 15 643 B3 | 10/2004 |
| EP | 1 464 875 A2 | 10/2004 |

* cited by examiner

*Primary Examiner*—William C Joyce
(74) *Attorney, Agent, or Firm*—Brooks Kushman P.C.

(57) ABSTRACT

An electrical shifting device for a vehicle includes a shift lever, a slider, and an actuator. The lever is rotatable about perpendicular axes to be able to deflect from a neutral position in anyone of different deflection directions. The lever includes a projection which extends along a first deflection direction. The slider is displaceable along a slider direction perpendicular to the first deflection direction. The slider has stages each engageable with the lever projection to limit the lever deflection in the first deflection direction. Each stage is different to limit the deflection of the lever in the first deflection direction to a different extent as a function of which stage engages the lever projection. The actuator positions the slider along the slider direction such that a selected slider stage engages the lever projection thereby allowing the lever deflection in the first deflection direction to be limited to different extent.

18 Claims, 2 Drawing Sheets

ELECTRIC SHIFT UNIT FOR A MOTOR VEHICLE

CROSS-REFERENCE TO RELATED APPLICATIONS

This is a continuation of International Application PCT/EP2006/008711, published in German, with an international filing date of Sep. 7, 2006, which claims priority to DE 10 2005 043 288.3, filed Sep. 9, 2005, the disclosures of which are both hereby incorporated by reference.

BACKGROUND OF THE INVENTION

1. Field of the Invention

The present invention relates to an electrical shifting device for use in a vehicle in which the shifting device includes a shift lever and an actuator which can activate or deactivate a shift stop for the shift lever.

2. Background Art

An electrical shifting device is used for the automatic transmission of a vehicle. The actual transmission shifting is performed either electro-hydraulically or by an electric motor whereas the particular shifting intent of the driver is electrically detected from the shifting device. The shifting device includes a shift lever and may include, for example, additional steering wheel rocker switches for up/down shifting.

The shift lever of a shifting device may have a multi-stable design in which the shift lever may be set in multiple fixed positions. Alternatively, the shift lever may have a mono-stable design similar to a joystick in which the shift lever has one stable neutral position to which the shift lever returns from a number of unstable setting positions.

In either case, sometimes it is desirable to exclude certain shift states as being the next selection from a currently selected shift state. For example, for a linear chain of possible shift states it may be advantageous to display when the selection possibilities for a shift state have been used up. As the detection and processing of shift states occur electronically, the exclusion of certain shifting possibilities can be performed by the underlying shifting logic system.

EP 1 464 875 A2 (corresponding to U.S. Patent Application Publication No. 2004/0194567) describes a shifting device having an actuator which is able to deactivate a shift stop so that the shift lever of the shifting device may swivel out of the shift position defined by the shift stop. The actuator includes a relatively complex rocker arm system having a number of different actuators.

SUMMARY OF THE INVENTION

An object of the present invention includes an electrical shifting device having a shift lever in which the actuating path of the shift lever is limited by a single controllable actuator, with the mechanical means being used for this purpose being simple, robust, and economical.

In carrying out the above object and other objects, the present invention provides an electrical shifting device for a vehicle. The shifting device includes a shift lever, a slider, and an actuator. The shift lever is rotatable about two mutually perpendicular axes to be able to deflect from a neutral position in any one of different deflection directions. The shift lever includes a projection which extends along a first one of the deflection directions. The slider is linearly displaceable along a slider direction perpendicular to the first deflection direction. The slider has stages each engageable one at a time with the projection of the shift lever to limit the deflection of the shift lever in the first deflection direction. Each stage has a different configuration such that the deflection of the shift lever in the first deflection direction is limited to a different extent as a function of which stage engages the projection of the shift lever. The actuator is operable to position the slider along the slider direction such that a selected one of the stages of the slider engages the projection of the shift lever thereby allowing the deflection of the shift lever in the first deflection direction to be limited to different extent.

Further, in carrying out the above object and other objects, the present invention provides another electrical shifting device for a vehicle. This shifting device includes a shift lever, a U-shaped slider, and an actuator. The shift lever is rotatable about perpendicular axes to be able to deflect from a neutral position in any one of different deflection directions. The shift lever includes a projection which extends along a first one of the deflection directions. The slider is displaceable along a slider direction perpendicular to the first deflection direction. The slider includes a long arm, a short arm, and an opening between the long and short arms. The long arm, the short arm, and the opening are engageable one at a time with the projection of the shift lever to limit the deflection of the shift lever in the first deflection direction. The deflection of the shift lever in the first deflection direction is limited to a different extent as a function of which of the long arm, the short arm, and the opening of the slider engages the projection of the shift lever. The actuator is operable to position the slider along the slider direction such that a selected one of the long arm, the short arm, and the opening of the slider engages the projection of the shift lever thereby allowing the deflection of the shift lever in the first deflection direction to be limited to different extent.

In an embodiment, a slider having at least two stages is situated so as to be linearly displaceable perpendicular to at least one deflection direction of the shift lever of a shifting device. An actuator operable with the slider can position the slider such that each stage of the slider is situated in the deflection direction of the shift lever thus allowing the deflection of the shift lever to be limited to differing extent.

In an embodiment, the actuator is an electrically controllable actuator such as a solenoid having a spring-loaded reset device.

In an embodiment, the actuator is a so-called piezomotor having an oscillation generator, a resonator, and a drivable component. The oscillation generator includes an active element having a piezoelectric piece which is energized to undergo changes in length in the (sub)micron range as a result of high-frequency electrical actuation using the inverse piezoelectric effect. These rapid length changes vibrate the resonator by which the drivable component is moved in the intended direction and speed via a contact surface with the component.

In an embodiment, the actuator controls the slider via a sliding guide. The sliding guide may have a linear or a non-linear progression thus enabling, for example, a specified force-path course or a tolerance-stable design of the end positions of the slider.

In an embodiment, the actuator controls the slider via an actuating lever which is supported on its end facing away from the slider so at to be rotatable about an axis perpendicular to the direction of motion of the slider. The required path and actuating force of the actuator may be varied by selecting the distance of the contact point of the actuator from the rotational axis of the actuating lever.

In an embodiment, the slider is a U-shaped structure having a long arm, a short arm, and an opening therebetween. Together with a corresponding design of the actuator, the slider may be displaced into one or the other of opposite end positions in a targeted manner by the corresponding control of the actuator. A spring-loaded reset device of the actuator returns the slider to its center neutral position when power is discontinued. As a result, targeted achievement of two different locking stages and security against failure of the shifting device is provided.

In an embodiment, the shifting paths of a mono-stable or multi-stable gear selector switch are locked as a function of the gear being engaged.

The above features, other features, and advantages of the present invention are readily apparent from the following detailed descriptions thereof when taken in connection with the accompanying drawings.

DETAILED DESCRIPTION OF THE PREFERRED EMBODIMENT(S)

Figure 1A:
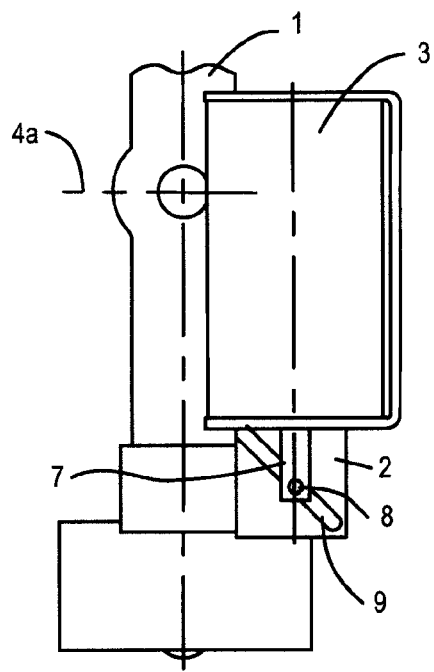
FIG. 1a-1c illustrates an electrical shifting device in accordance with an embodiment of the present invention in which the slider of the shifting device is actuated by a solenoid via a sliding guide.
Figure 1B:
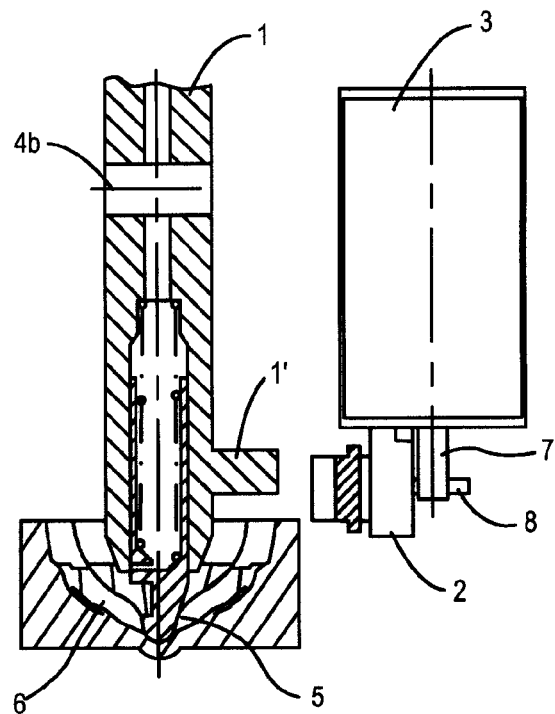
Figure 1C:
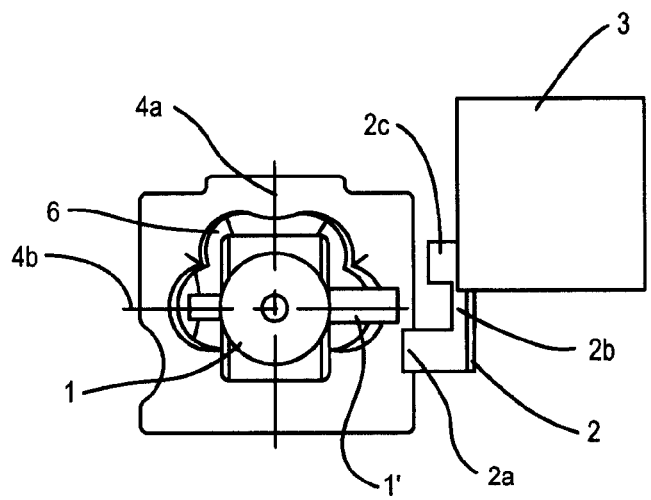
Figure 2A:
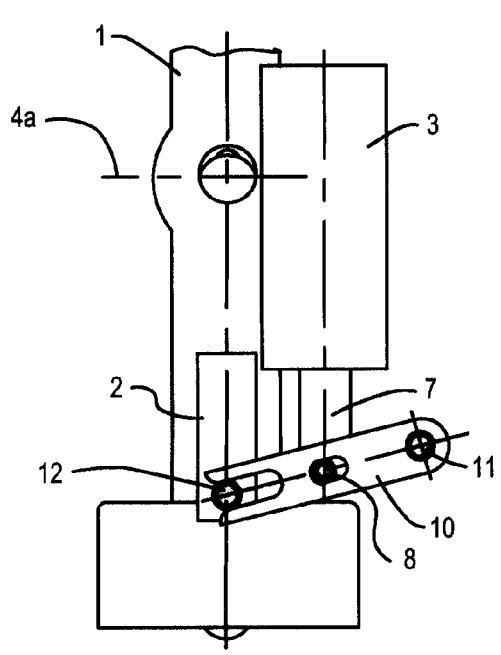
FIG. 2a-2b illustrates an electrical shifting device in accordance with an embodiment of the present invention in which the slider of the shifting device is actuated by a solenoid via a rotatable actuating lever.
Figure 2B:
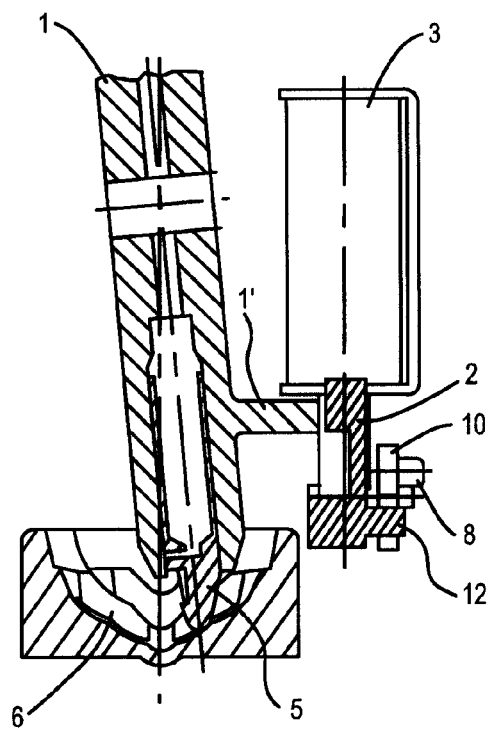

FIGS. 1 and 2 respectively illustrate two different embodiments of an electrical shifting device and denote like elements with the same reference numerals.

Referring now to FIG. 1, the shifting device includes a shift lever 1 having a projection 1' extending therefrom. Shift lever 1 is supported so as to be rotatable about first and second mutually perpendicular axes 4a and 4b. Shift lever 1 includes a spring-loaded stop bolt 5 at its lower end. Stop bolt 5 is guided in a three-dimensional locking curve 6 to achieve the actuating forces and locking positions of shift lever 1.

The shifting device further includes a limiting element in the form of a slider 2. Slider 2 allows the deflection of shift lever 1 to be limited in a direction in a targeted manner when shift lever 1 swivels about first axis 4a. Slider 2 is movable perpendicular to this deflection direction of shift lever 1. Slider 2 includes a U-shaped three-stage element having a long arm 2a, a short arm 2c, and an opening 2b therebetween. Long arm 2a, short arm 2c, and opening 2b each represent a stage of slider 2.

Projection 1' of shift lever 1 points in the direction of slider 2. Projection 1' collides with slider 2 when shift lever 1 swivels about first axis 4a. The degree of deflection of shift lever 1 for which this collision occurs depends on which of long arm 2a, short arm 2c, and opening 2b of slider 2 is situated opposite projection 1'. Opening 2b permits the maximum deflection of shift lever 1. Slider 2 is guided in a housing which provides a supporting force acting in the direction opposite to an actuating force introduced into slider 2 when shift lever 1 collides with slider 2 in order to absorb the actuating force.

The shifting device further includes an actuator having a solenoid 3. Solenoid 3 includes a spring-loaded reset device integrated into the housing of the solenoid. Solenoid 3 is able to position slider 2 relative to shift lever 1 in order to allow or prevent swiveling of shift lever 1 according to a particular shifting situation.

Solenoid 3 actuates slider 2 via a sliding guide. A pin 8 is connected to a push rod 7 of solenoid 3. Pin 8 extends in a sliding track 9 integrally molded into the back side of slider 2 facing away from shift lever 1. Sliding track is shown in FIG. 1 as having a linear design. Sliding track 9 may alternatively have a non-linear progression in order to achieve a specified force-path course or a tolerance-stable design of the end positions of slider 2.

Referring now to FIG. 2, solenoid 3 actuates slider 2 via an actuating lever 10. Actuating lever 10 is supported on its end facing away from slider 2 so as to be rotatable about an axis 11 perpendicular to the motion of direction of slider 2. Slider 2 includes a pin 12 on its back side facing away from shift lever 1. Pin 12 is guided in a fork-shaped open end of actuating lever 10 facing away from rotational axis 11 of actuating lever 10. Actuating lever 10 includes an opening between its two ends. Solenoid 3 engages in the opening of actuating lever 10 via a pin 8 connected to push rod 7 of solenoid 3. The closer this contact point is to rotational axis 11 of actuating lever 10, the smaller the lift which push rod 7 of solenoid 3 undergoes. A higher actuating force may be necessary due to the associated transmission of force.

In each of the shifting devices shown in FIGS. 1 and 2, solenoid 3 is designed such that push rod 7 and thus slider 2 may be displaced into one or the other of its opposite end positions in a targeted manner by a correspondingly poled application of power. The spring-loaded reset device of solenoid 3 returns push rod 7 and thus slider 2 to its center neutral position when the power is discontinued.

Thus, by short arm 2c and long arm 2a of slider 2 it is possible to achieve a first and a second locking stage in a targeted manner, and in the event of failure of solenoid 3 the spring-loaded reset device of solenoid 3 ensures that opening 2b is positioned opposite from shift lever 1 or projection 1' of shift lever 1 thus allowing unhindered shifting.

With appropriate geometric designs of slider 2 and shift lever 1 or projection 1' of shift lever 1, it is also possible to return shift lever 1 from an occupied shift position, in which shift lever 1 is held by the locking device formed by spring-loaded stop bolt 5 and three-dimensional locking curve 6, to the neutral position of shift lever 1 in a targeted manner.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. An electrical shifting device for a vehicle, the shifting device comprising:

a shift lever rotatable about two mutually perpendicular axes to be able to deflect from a neutral position in any one of a plurality of different deflection directions, wherein the shift lever includes a projection which extends along a first one of the deflection directions;

a slider linearly displaceable along a slider direction perpendicular to the first deflection direction, wherein the slider has stages each engageable one at a time with the projection of the shift lever to limit the deflection of the shift lever in the first deflection direction, wherein each stage has a different configuration such that the deflection of the shift lever in the first deflection direction is limited to a different extent as a function of which stage engages the projection of the shift lever; and an actuator operable to position the slider along the slider direction such that a selected one of the stages of the slider engages the projection of the shift lever thereby allowing the deflection of the shift lever in the first deflection direction to be limited to different extent; wherein the actuator is a solenoid having a spring-loaded reset device, wherein the spring-loaded reset device is operable to cause the slider to move along the slider direction to a center neutral position upon power failure to the solenoid.

2. The shifting device of claim 1 wherein:
the spring-loaded reset device is integrated into a housing of the solenoid.

3. The shifting device of claim 1 wherein:
the actuator controls the position of the slider along the slider direction via a sliding guide.

4. The shifting device of claim 3 wherein:
the sliding guide includes a sliding track having a linear progression, wherein the sliding track is part of the slider.

5. The shifting device of claim 1 wherein:
the slider is guided in a housing which absorbs forces that are introduced into the slider via the shift lever.

6. The shifting device of claim 1 wherein:
the slider has three stages and is U-shaped having a long arm, a short arm, and an opening between the long and short arms, wherein the long arm is a first stage of the slider, the short arm is a second stage of the slider, and the opening is a third stage of the slider.

7. The shifting device of claim 1 wherein:
the shift lever includes a spring-loaded stop bolt guided in a three-dimensional locking curve accommodated in the lower end of the shift lever.

8. The shifting device of claim 1 wherein:
the shift lever is a gear selector switch.

9. The shifting device of claim 1 wherein:
the position of the shift lever is variable in response to movement of the slider.

10. The shifting device of claim 9 wherein:
the shift lever is returnable to its neutral position in response to movement of the slider.

11. An electrical shifting device for a vehicle, the shifting device comprising:
a shift lever rotatable about two mutually perpendicular axes to be able to deflect from a neutral position in any one of a plurality of different deflection directions, wherein the shift lever includes a projection which extends along a first one of the deflection directions;
a slider linearly displaceable along a slider direction perpendicular to the first deflection direction, wherein the slider has stages each engageable one at a time with the projection of the shift lever to limit the deflection of the shift lever in the first deflection direction, wherein each stage has a different configuration such that the deflection of the shift lever in the first deflection direction is limited to a different extent as a function of which stage engages the projection of the shift lever; and
an actuator operable to position the slider along the slider direction such that a selected one of the stages of the slider engages the projection of the shift lever thereby allowing the deflection of the shift lever in the first deflection direction to be limited to different extent; wherein the actuator controls the position of the slider along the slider direction via an actuating lever, wherein the actuating lever is supported on an end facing away from the slider so as to be rotatable about an axis perpendicular to the slider direction.

12. The shifting device of claim 11 wherein:
the actuator includes a piezomotor having an oscillation generator, a resonator, and a drivable component.

13. The shifting device of claim 11 wherein:
the actuator is designed such that the slider may be displaced along the slider direction into one or the other of opposite end positions in a targeted manner by corresponding control by the actuator, and a spring-loaded reset device of the actuator returns the slider to a center neutral position along the slider direction when power to the actuator is discontinued.

14. An electrical shifting device for a vehicle, the shifting device comprising:
a shift lever rotatable about perpendicular axes to be able to deflect from a neutral position in any one of a plurality of different deflection directions, wherein the shift lever includes a projection which extends along a first one of the deflection directions;
a U-shaped slider displaceable along a slider direction perpendicular to the first deflection direction, wherein the slider includes a long arm, a short arm, and an opening between the long and short arms, wherein the long arm, the short arm, and the opening are engageable one at a time with the projection of the shift lever to limit the deflection of the shift lever in the first deflection direction, wherein the deflection of the shift lever in the first deflection direction is limited to a different extent as a function of which of the long arm, the short arm, and the opening of the slider engages the projection of the shift lever; and
an actuator operable to position the slider along the slider direction such that a selected one of the long arm, the short arm, and the opening of the slider engages the projection of the shift lever thereby allowing the deflection of the shift lever in the first deflection direction to be limited to different extent.

15. The shifting device of claim 14 wherein:
the actuator controls the position of the slider along the slider direction via a sliding guide.

16. The shifting device of claim 15 wherein:
the sliding guide includes a sliding track which is part of the slider.

17. The shifting device of claim 14 wherein:
the actuator controls the position of the slider along the slider direction via an actuating lever, wherein the actuating lever is supported on an end facing away from the slider so as to be rotatable about an axis perpendicular to the slider direction.

18. The shifting device of claim 14 wherein:
the shift lever includes a spring-loaded stop bolt guided in a three-dimensional locking curve accommodated in the lower end of the shift lever.

* * * * *